(12) United States Patent
Masser (10) Patent No.: US 7,631,546 B2
(45) Date of Patent: Dec. 15, 2009

(54) METHOD AND APPARATUS FOR MONITORING OF A SPM ACTUATOR

(75) Inventor: Carl Masser, Santa Barbara, CA (US)

(73) Assignee: Veeco Instruments Inc., Plainview, NY (US)

( * ) Notice: Subject to any disclaimer, the term of this patent is extended or adjusted under 35 U.S.C. 154(b) by 448 days.

(21) Appl. No.: 11/428,047

(22) Filed: Jun. 30, 2006

(65) Prior Publication Data

US 2008/0000291 A1    Jan. 3, 2008

(51) Int. Cl.
*G01B 5/28* (2006.01)
(52) U.S. Cl. ........................................ 73/105
(58) Field of Classification Search ............... None
See application file for complete search history.

(56) References Cited

U.S. PATENT DOCUMENTS

| | | | |
|---|---|---|---|
| 4,185,503 A * | 1/1980 | Saito | 73/653 |
| 5,196,713 A | 3/1993 | Marshall | |
| 5,376,790 A | 12/1994 | Linker et al. | |
| 6,130,427 A | 10/2000 | Park et al. | |
| 6,530,268 B2 | 3/2003 | Massie | |
| 6,612,160 B2 | 9/2003 | Massie et al. | |
| 6,920,863 B1 | 7/2005 | Aono et al. | |
| 6,928,863 B2 * | 8/2005 | Massie | 73/105 |
| 7,038,443 B2 | 5/2006 | Proksch et al. | |
| 2006/0090778 A1 | 5/2006 | Oakes et al. | |

OTHER PUBLICATIONS

L.M. Picco, L. Bozec, A. Ulcinas, D.J. Engledew, M. Antognozzi, M.A. Horton, and M.J. Miles, Breaking the speed limit with atomic force microscopy, Nanotechnology 18 (2007).

T. Ando, T. Uchihashi, N. Kodera, D. Yamamoto, M. Taniguchi, A. Miyagi, and H. Yamashita, Invited Review: High-speed AFM and nano-visualization of biomolecular processes. Pflügers Archiv -Eur. J. Physiol.

T. Ando, T. Uchihashi, N. Kodera, D. Yamamoto, M. Taniguchi, A. Miyagi, and H. Yamashita, Review: High-speed atomic force microscopy for observing dynamic biomolecular processes. J. Mol. Recognit. 20:448-458 (2007).

(Continued)

*Primary Examiner*—Robert R Raevis
(74) *Attorney, Agent, or Firm*—Boyle Frederickson, S.C.

(57) ABSTRACT

A method and apparatus are provided for monitoring motion of a scanning probe microscope (SPM) actuator using an improved optical displacement sensor (ODS) including a light emitter, an intensifier, and a photodetector. One of these three devices, most preferably the intensifier, is preferably movable with the actuator and relative to the other two devices. The intensifier intensifies the light incident on the detecting face of the photodetector, increasing the sensitivity of the ODS and improving the ability of the SPM to translate the actuator in the desired manner. The photodetector preferably is a split diode or a quad diode photodetector. The light emitter includes at least a light source such as an LED and may additionally include an aperture that limits the light passing therethrough to that which contributes to the displacement signal, thereby reducing shot noise and increasing the signal-to-noise ratio.

28 Claims, 9 Drawing Sheets

OTHER PUBLICATIONS

H. Yamashita, T. Uchihashi, N. Kodera, A. Miyagi, D. Yamamoto, T. Ando, Tip-sample distance control using photo-thermal actuation of a small cantilever for high-speed atomic force microscopy. Rev. Sci. Instrum. 78:083702 (5 pages) (2007).

S. Morita, H. Yamada, and T. Ando, Japan AFM roadmap 2006. Nanotechnol. 18:08401 (10 pages) (2007).

T. Uchihashi, H. Yamashita, and T. Ando, Fast phase imaging in liquids using a rapid scan atomic force microscope. Appl. Phys. Lett. 89, 213112 (3 pages) (2006).

N. Kodera, M. Sakashita, and T. Ando, Dynamic PID controller for high-speed atomic force microscopy. Rev. Sci. Instrum. 77(8): 083704 (7 pages) (2006).

H. Koide, T. Kinoshita, Y. Tanaka, S. Tanaka, N. Nagura, G. Meyer zu Höste, A. Miyagi, and T. Ando, Identification of the specific IQ motif of myosin V from which calmodulin dissociates in the presence of Ca2+. Biochemistry 45(38): 11598-11604 (2006).

M. Yokokawa, C. Wada, T. Ando, N. Sakai, A. Yagi, S.H. Yoshimura and K. Takeyasu, Fast-scanning atomic force microscopy reveals the ATP/ADP-dependent conformational changes of GroEL. EMBO J. 25:4567-4576 (2006).

M. Yokokawa, S.H. Yoshimura, Y. Naito, T. Ando, A. Yagi, N. Sakai, K. Takeyasu, Fast-scanning atomic force microscopy reveals the molecular mechanism of DNA cleavage by Apal endonuclease. IEE Proc Nanobiotechnol. 153 (4):60-66 (2006).

T. Ando, T. Uchihashi, N. Kodera, A. Miyagi, R. Nakakita, H. Yamashita and M. Sakashita. High-speed Atomic Force Microscopy for Studying the Dynamic Behavior of Protein Molecules at Work. Jpn. J. Appl. Phys. 45(3B):1897-1903 (2006).

T. Uchihashi, N. Kodera, H. Itoh, H. Yamashita and T. Ando. Feed-forward Control for High-Speed AFM Imaging of Biomolecules. Jpn. J. Appl. Phys. 45(3B):1904-1908 (2006).

T. Ando, T. T Uchihashi, N. Kodera, A. Miyagi, R. Nakakita, H. Yamashita and K. Matada, High-speed AFM for Capturing the Dynamic Behavior of Protein Molecules at Work. e-J. Surf Sci. Nanotech. 3:384-392 (2005).

N. Kodera, H. Yamashita and T. Ando, Active Damping of the Scanner for High-speed Atomic Force Microscopy. Rev. Sci. Instrum. 76: 053708 (5 pages) (2005).

R. Ishikawa, T. Sakamoto, T. Ando, S. Higashi-Fujime and K. Kohama, Polarized Actin Bundles Formed by Human fascin-1: Their Sliding and Disassembly on Myosin II and Myosin V in vitro. J. Neurochem. 87:676-685 (2003).

Ando, T., N. Kodera, D. Maruyama, E. Takai, K. Saito & A. Toda, A High-speed Atomic Force Microscope for Studying Biological Macromolecules in Action. Jpn. J. Appl. Phys. 41:4851-4856 (2002).

Ando, T., N. Kodera, E. Takai, D. Maruyama, K. Saito & A. Toda, A High-speed Atomic Force Microscope for Studying Biological Macromolecules. Proc. Natl. Acad. USA 98:12468-12472 (2001).

Hansma, P.K., G. Schitter, G. E. Fantner, C. Prater, High-Speed Atomic Force Microscopy, Science 314, 601:D01; 10.1126/science. 1133497 (2006).

G. Schitter, K.J. Astrom, B. DeMartini, G.E. Fantner, K. Turner, and P.K. Hansma, Design and Modeling of a High Speed Scanner for Atomic Force Microscopy, Proceedings of the American Control Conference, Minneapolis, MN, Jun. 14-16, 2004 (pp. 502-507).

* cited by examiner

METHOD AND APPARATUS FOR MONITORING OF A SPM ACTUATOR

BACKGROUND OF THE INVENTION

1. Field of the Invention

The invention relates to scanning probe microscopes (SPMs). More particularly, it is directed to a method and apparatus for monitoring movement of an atomic force microscope (AFM) actuator using an auxiliary position sensor.

2. Discussion of the Prior Art

A scanning probe microscope operates by providing relative scanning movement between a measuring probe and a sample while measuring one or more properties of the sample.

Commonly, an actuator such as a piezoelectric tube (often referred to herein as a "piezo tube") or flexure is used to generate relative motion between the measuring probe and the sample surface. A piezoelectric tube is a device that moves in one or more directions when voltages are applied to electrodes disposed inside and outside the tube. Actuators may be combined in an arrangement coupled to the probe, the sample, or both. Most typically, an actuator arrangement includes an X-Y actuator that drives the probe or sample in a horizontal, or XY plane and a Z actuator that moves the probe or sample in a vertical, or Z direction.

Piezoelectric tubes and other types of actuators are imperfect. For example, a piezo tube often does not move only in the intended direction. When a Z actuator, for instance, is commanded to move in the Z-direction by the application of an appropriate voltage between the actuator's electrodes, the Z actuator moves not only in the Z direction, but in the X and/or Y directions as well. This unwanted parasitic motion limits the accuracy of measurements obtained by scanning probe microscopes. The amount of this parasitic motion varies with the geometry of the tube and with the uniformity of the tube material, but typically cannot be eliminated to achieve the accuracy required by present instruments.

Methods of monitoring the motion of the probe or sample when driven by a SPM actuator have been developed in an attempt to compensate for this parasitic X and Y error, with mixed results. The devices are typically calibrated by applying a voltage to the X-Y actuator and the Z actuator, and then measuring the actual distance that the sample or probe travels. Thus, the position of the actuator is estimated by the voltage that is applied to the X-Y actuator and the Z actuator. However, correcting for the (X,Y) position error introduced by the Z actuator on the probe or sample is difficult because it requires additional calibration steps and more complex circuitry to determine the correct voltage to apply to the X-Y actuator.

Moreover, with respect to movement in the intended direction, piezoelectric tubes and other types of actuators typically do not move in a predictable way when known voltages are applied. The ideal behavior would be that the actuator be "linear," i.e., move in exact proportion to the voltage applied. Instead actuators, including piezo tubes, often move in a non-linear manner, meaning that their sensitivity (e.g., nanometers of motion per applied voltage) can vary with variations in voltage. In addition, they suffer from hysteresis and creep. Most generally, the response to an incremental voltage change will depend on the history of previous voltages applied to the actuator. These effects can cause a large prior motion to affect the response of a commanded move, even minutes later.

Similarly, vertical measurements in scanning probe microscopy are typically calculated mathematically by recording the voltage applied to the Z actuator and then multiplying by the actuator's calibrated sensitivity in nm/V. However, as mentioned previously, this sensitivity is not constant and most often depends on the previous voltages applied to the actuator. Using the voltage applied to the actuator to calculate the vertical motion of the actuator therefore will always result in an error with respect to the actual motion. This error can translate directly into errors when measuring surface topography of a sample and performing other metrology experiments. These issues have been addressed specifically for the case in which the probe assembly of the AFM is coupled to the actuator (i.e., the case in which the probe assembly moves in three orthogonal directions referenced below).

Some SPMs attempt to improve accuracy by using an auxiliary displacement sensor to actively monitor actuator movement and adjusting the voltage to the appropriate SPM actuator(s) to cause the actuator to move in the desired manner. Several auxiliary displacement sensors, sometimes referred to as position sensors, have been proposed for monitoring actuator movement, including Linear Variable Displacement Transducers (LVDTs), capacitance sensors, strain gauge sensors, and optical displacement sensors (ODSs). ODSs, sometimes referred to as optical position sensors or OPSs, are preferred in many applications because they are sufficiently compact to fit in a SPM scan head and exhibit lower power dissipation than many other known sensors. It is with ODSs that the invention is concerned.

Figure 1A:
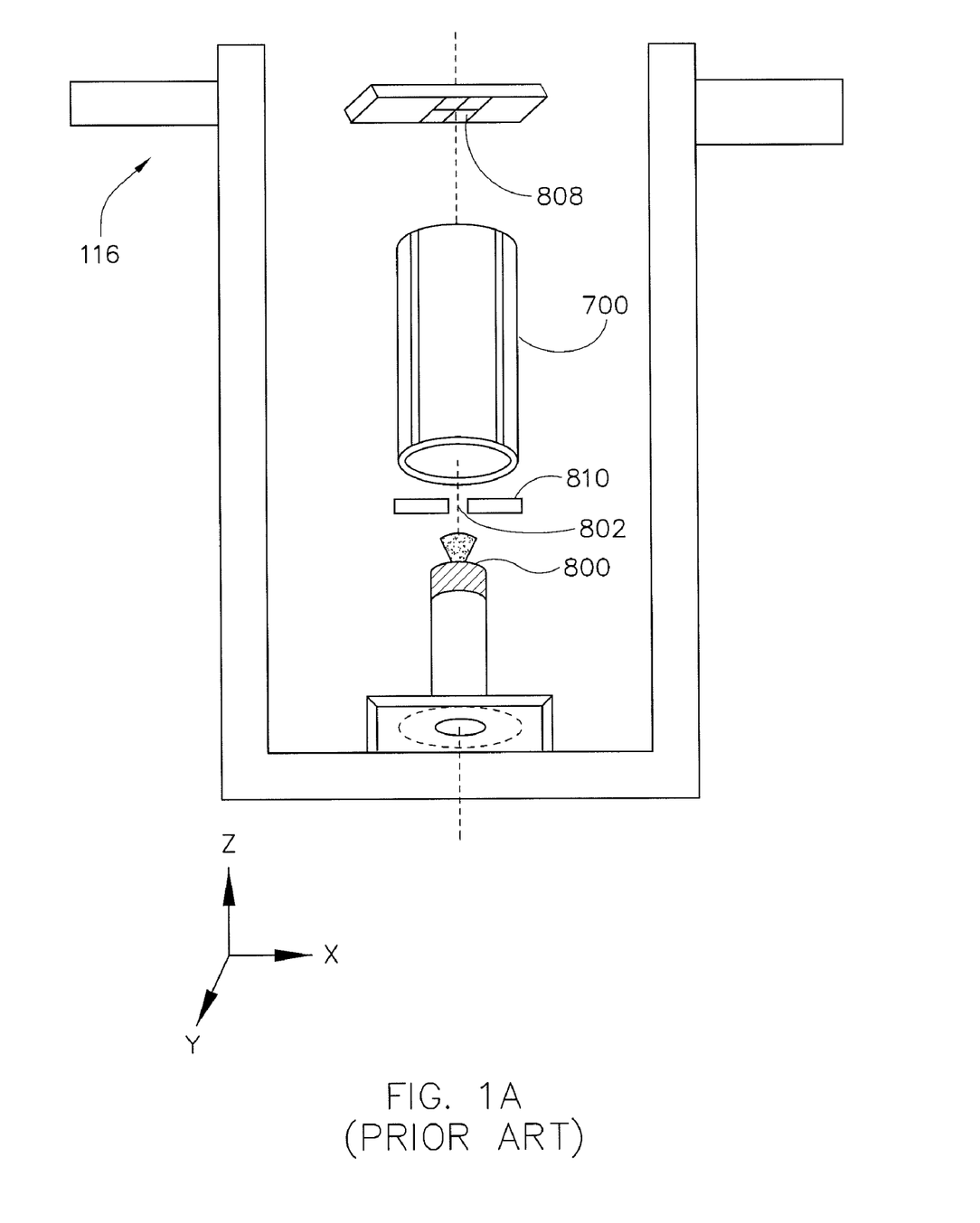
FIG. 1A is a schematic diagram of a portion of a scanning probe microscope (SPM) fitted with a first prior art optical displacement sensor (ODS), appropriately labeled "PRIOR ART;"

One ODS was installed on a SPM marketed by Park Scientific Instruments and generally disclosed, for example, in U.S. Pat. No. 5,376,790 to Linker et al. (the Linker patent). Referring to FIG. 1A, the commercial version of the ODS disclosed in the Linker patent includes a fixed light source and a photodetector that moves with the SPM actuator. In that device, a tube scanner 700 is mounted in x,y coarse stage 116 of the SPM. Mounted at the base of tube scanner 700 is a light emitting diode (LED) 800, which directs a light beam 802 upward along the vertical axis of tube scanner 700. A sample platform (not shown) is mounted at the top of tube scanner 700. A quad-cell position-sensitive photodetector (PSPD) 808 is mounted in line with the axis of tube scanner 700. A slit aperture 810 is positioned between the LED 800 and the photodetector 808 to reduce shot noise. In use, movement of the tube scanner in the X or Y direction results in corresponding movement of the LED 800, which is detected by the photodetector 808.

The Park Scientific ODS works reasonably well but experiences drawbacks. For instance, it has very low sensitivity because the light reaching the photodetector 808 has relatively low intensity. Noise of about 5-10 nm RMS with a bandwidth of about 1 kHz is typical. The Park Scientific ODS also requires an electrical connection to a moving object, in this case the quad cell, adding to the complexity and weight of the system. It also increases the risk of electrical interference with the photodetection.

Figure 1B:
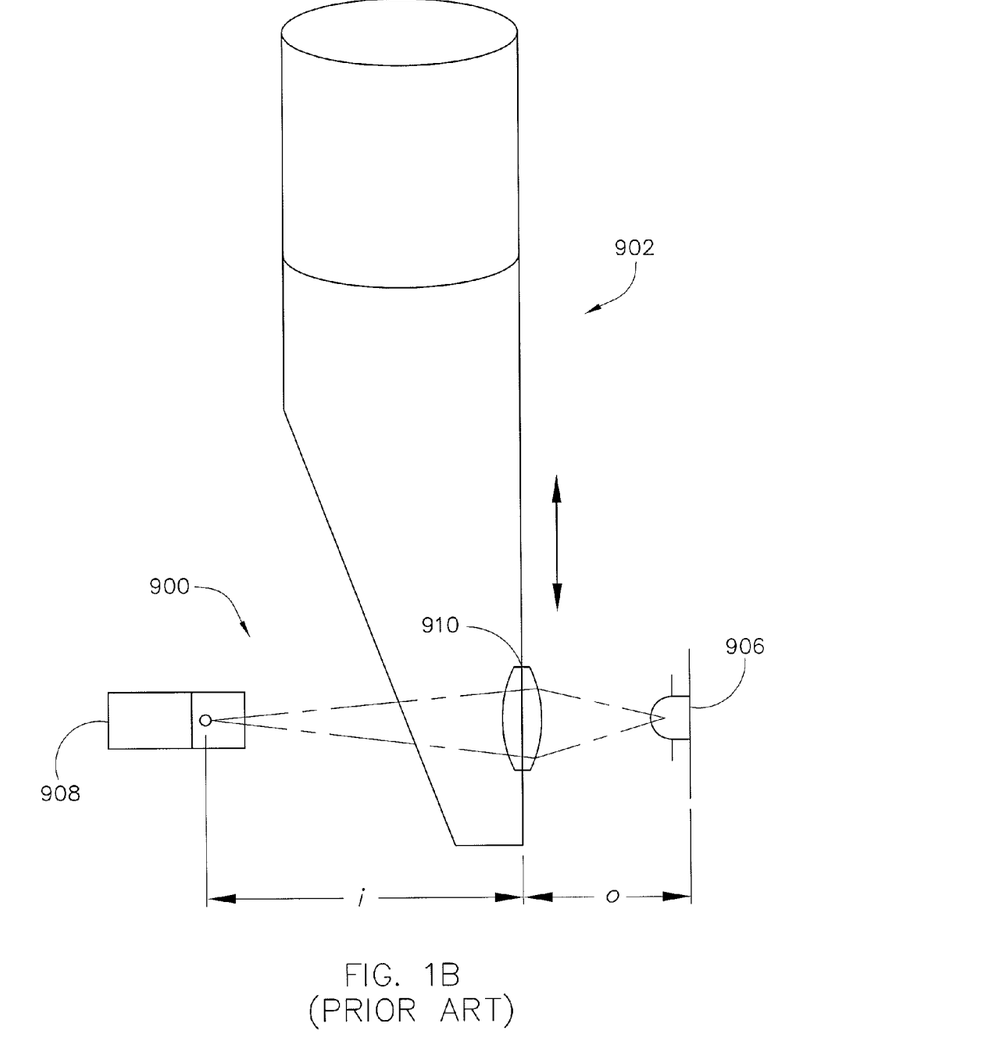
FIG. 1B is a schematic diagram of a portion of a SPM fitted with a second prior art ODS, appropriately labeled "PRIOR ART;"

Another type of ODS is described in U.S. Pat. Nos. 6,612,160, 6,530,268, and 6,920,863 to Massie (the Massie patents) assigned to Veeco and commercialized in the Hybrid XYZ scanner. One of the arrangements disclosed in the Massie patents is shown in FIG. 1B. In that device, an ODS 900 is used to monitor displacement of an actuator arrangement 902. The ODS 900 includes a light source 906 that is fixed relative to the actuator arrangement 902, a photodetector 908 in the form of a position sensitive linear photodiode that is also fixed relative to the actuator arrangement 902, and a lens 910 that is positioned between the light source 906 and the photodetector 908 and that moves with the actuator arrangement. The lens 910 magnifies the light projected onto the photodetector 908 by a factor of 1+i/o, where "i" is the orthogonal distance from sensor 908 to lens 910, and "o" is the orthogonal distance from lens 910 to light source 906. In operation, as actuator arrangement 902 is actuated and caused to move in a particular direction, lens 910 correspondingly moves, thereby causing the location of light impingement onto the photodetector 908 to move. Because both the light source 906 and the photodetector 908 are fixed, measuring the position at which the light beam "L" output by lens 910 impinges on photodetector 908 is indicative of the movement of the actuator arrangement 902. The lens 910 magnifies the motion of the light on the detector during this process in an effort to increase sensitivity.

This ODS 900 has the advantage of lacking electrical connections to a moving object. However, the magnifying lens also increases the size of the spot on the photodetector. This requires that a larger photodetector be used to maintain linearity, which in turn results in a proportional decrease in sensitivity and signal to noise ratio. This effect can be alleviated by the use of a light source with exceptionally small emitting area, but such sources are expensive and have high power dissipation.

The need therefore has arisen to provide an ODS for a SPM that has very high sensitivity and low cost.

The need has additionally arisen to provide an optically based method of monitoring movement of a SPM actuator.

SUMMARY OF THE INVENTION

In accordance with an aspect of the invention, a method is provided of monitoring motion of a scanning probe microscope (SPM) actuator using an improved optical displacement sensor (ODS) including a light emitter, an intensifier, and a photodetector. One of these three devices, most preferably the intensifier, is preferably movable with the actuator and relative to the other two devices. The intensifier intensifies the light incident on the detecting face of the photodetector, increasing the sensitivity of the ODS and improving the ability of the SPM to translate the actuator in the desired manner.

The photodetector preferably is a split diode or a quad diode photodetector. The light emitter includes at least a light source such as an LED and may additionally include an aperture that limits the light passing therethrough to that which contributes to the displacement signal, thereby reducing shot noise and increasing the signal-to-noise ratio. When used with a split diode or quad diode, the aperture preferably limits the light to that which will move from one side of the detector face to another during SPM operation. A slit aperture is preferably used for a split diode photodetector, and a cruciform aperture is preferably used for a quad diode photodetector.

The intensifier preferably comprises a demagnifier, more preferably a demagnifying lens, that is positioned between the light source and the photodetector and that increases the intensity of the light incident on the detector face by demagnifying the light. The net sensitivity increase is equal to $D/(1+1/D)$, where D is the demagnification ratio and is always greater than 1.

It is believed that the combination of the aperture and the intensification improves performance when compared to previously known ODSs by a factor of about ten.

A SPM fitted with an ODS having some or all of the characteristics described above is also provided.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

In a preferred embodiment of the invention, a scanning probe microscope (SPM) is fitted with an auxiliary position detector in the form of an optical displacement sensor (ODS) exhibiting improved sensitivity and reduced noise when compared to prior known ODSs. The SPM may comprise any instrument that utilizes a tip-bearing probe to obtain information concerning a sample. It may, for instance, comprise a scanning tunneling microscope (STM), a scanning magnetic force microscope (MFM), a scanning capacitance microscope (SCM), a scanning near-field optical microscope (NSOM), a scanning thermal microscope (SThM), or an atomic force microscope (AFM). An embodiment of the invention in the form of an AFM will now be disclosed, it being understood that the invention applies to all other SPMs as well.

Figure 2:
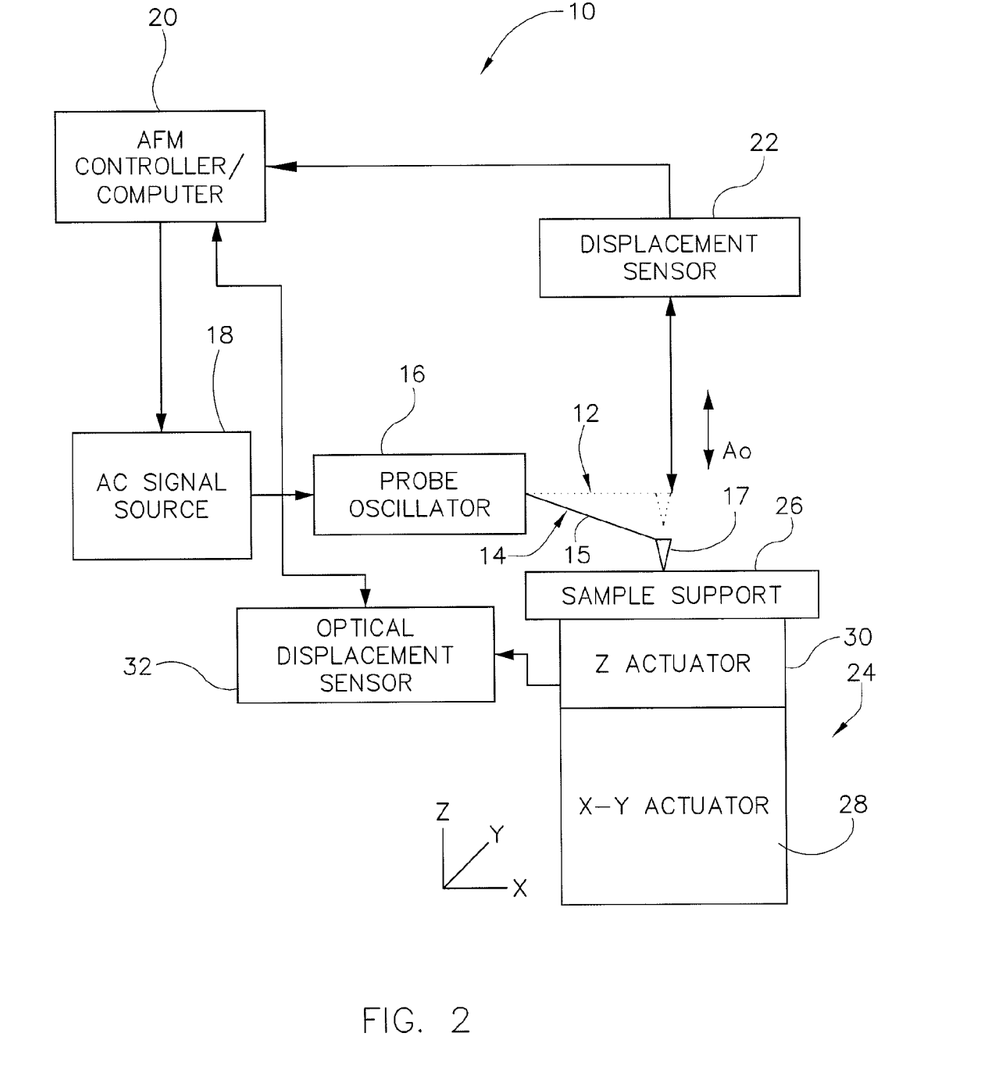
FIG. 2 is a block diagram that conceptually illustrates a SPM fitted with an ODS constructed in accordance with a preferred embodiment of the invention.

Referring to FIG. 2, an AFM 10 constructed in accordance with a preferred embodiment of the invention includes a probe device 12 including a base (not shown) and a probe 14, the probe 14 having a cantilever 15 supported by the base and a tip 17 located on the free end of cantilever 15. An actuator or drive 16 drives cantilever 15 to deflect during operation. For Tapping Mode™ operation, drive 16 is an oscillating drive that drives probe 14 at or near the probe's resonant frequency. Commonly, an electronic signal is applied from an AC signal source 18 under control of an AFM controller 20 to drive 16, thus moving probe 14. It should be noted that the controller 20 could comprise a single digital controller such as a CPU, analog circuitry, and/or a hybrid controller having some digital circuitry and some analog circuitry. It could also be formed from a number of integrated or dedicated control devices. The probe 14 may be driven to oscillate, preferably at a selected free oscillation amplitude $A_o$. $A_o$ can be varied over a broad range, e.g., from microns to nanometers, the latter being typically used for non-contact force measurements. The oscillating drive 16 may be coupled to a stationary work head or may be formed integrally with the cantilever 15 of probe 14 as part of a self-actuated cantilever/probe. Probe motion is monitored under feedback using a displacement sensor 22 as detailed below. In particular, a deflection detection apparatus 22 employs a laser to direct a beam towards the backside of probe 14 which is then reflected towards a detector, such as a four-quadrant photodetector.

The probe 14 and/or sample are also driven to move relative to one another via an actuator arrangement 24 coupled to a sample support 26, the probe 14, or both. This movement is controlled via feedback by computer/controller 20. Many different actuator arrangements may be utilized for this purpose. Moreover, though actuator arrangement 24 is shown coupled to a sample support 26, it may be employed to move the probe 14 relative to the sample. The actuator arrangement 24 may comprise a single actuator that moves the driven element (the probe or the sample) in one or more directions. In a preferred embodiment, the actuator arrangement includes a first, X-Y actuator 28 that drives the probe or sample to move in an X-Y plane and a second, Z actuator 30 that drives the probe or sample to move in the Z direction. The actuators may, for example, comprise piezoelectric tubes, piezoelectric stacks, or hybrid arrangements of piezos and flexural elements. Alternatively, actuators can be made using any of a large variety of materials and drives forces, for example using electrostrictive, magnetostrictive, electrostatic or inductive drive forces. They could alternatively comprise any other device or devices that generate direct or indirect linear or non-linear movement of the driven element. The actuator arrangement 24 may be connected to the driven device either independently or as an assembly with one actuator, such as the Z actuator 30, being sandwiched between the other actuator (the X-Y actuator 28 in the present example) and the driven element, in this case the sample support 26.

An auxiliary displacement sensor in the form of an ODS 32 monitors movement of at least one of the actuators of arrangement 24. In the typical case of a two actuator arrangement, an ODS preferably is provided for at least the X-Y actuator 28. A second ODS may be provided for the Z actuator, or the Z actuator could lack an auxiliary displacement sensor or be monitored in a different manner entirely. Each ODS is optically coupled to the corresponding actuator and electrically coupled to the controller 20.

In operation, as the probe 14 is brought into contact with a sample, sample characteristics can be monitored by detecting changes in a characteristic of the deflection oscillation of probe 14. As the beam from displacement sensor 22 translates across the detector face, appropriate signals are transmitted to controller 20, which processes the signals to determine changes in the deflection/oscillation of probe 14. Commonly, controller 20 generates control signals to maintain a constant force between the tip 17 and sample, typically to maintain a setpoint characteristic of the deflection/oscillation of probe 14. For example, controller 20 is often used to maintain the oscillation amplitude at a setpoint value, $A_S$, to insure a generally constant force between the tip 17 and sample. Alternatively, a setpoint phase or frequency may be used.

During this operation, ODS 32 provides information to the controller 20 regarding the position actuator, which then transmits correction signals to the corresponding actuator under feedback to assure that the actuator moves as desired, hence reducing the effects of creep and hysterisis on actuator motion. In the case of the X-Y actuator 28, the ODS 32 will act to ensure linear motion of the actuator in the XY plane during a scan or probe positioning operation. If an ODS were provided for the Z actuator, the ODS would act to ensure linear movement in the Z direction.

Figure 3A:
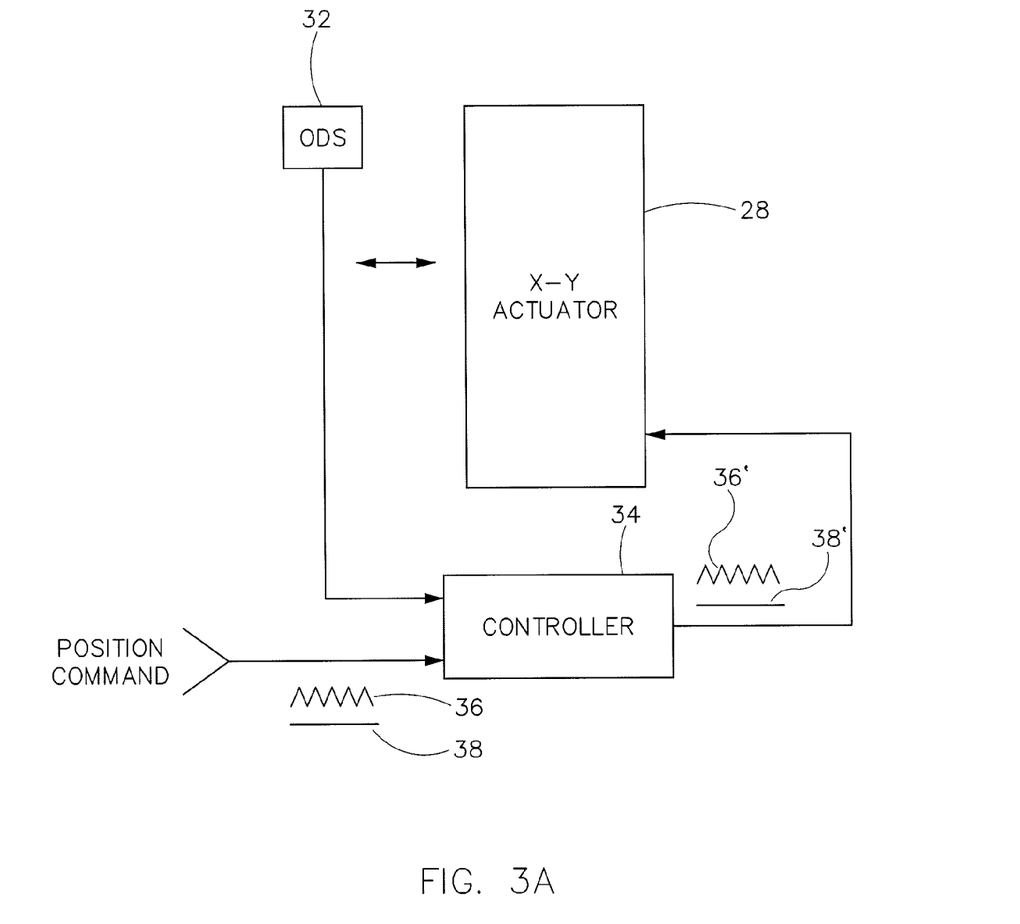
FIG. 3A schematically shows a first feedback control technique via which signals form the ODS of the SPM of FIG. 2 may be used to control SPM operation.
Figure 3B:
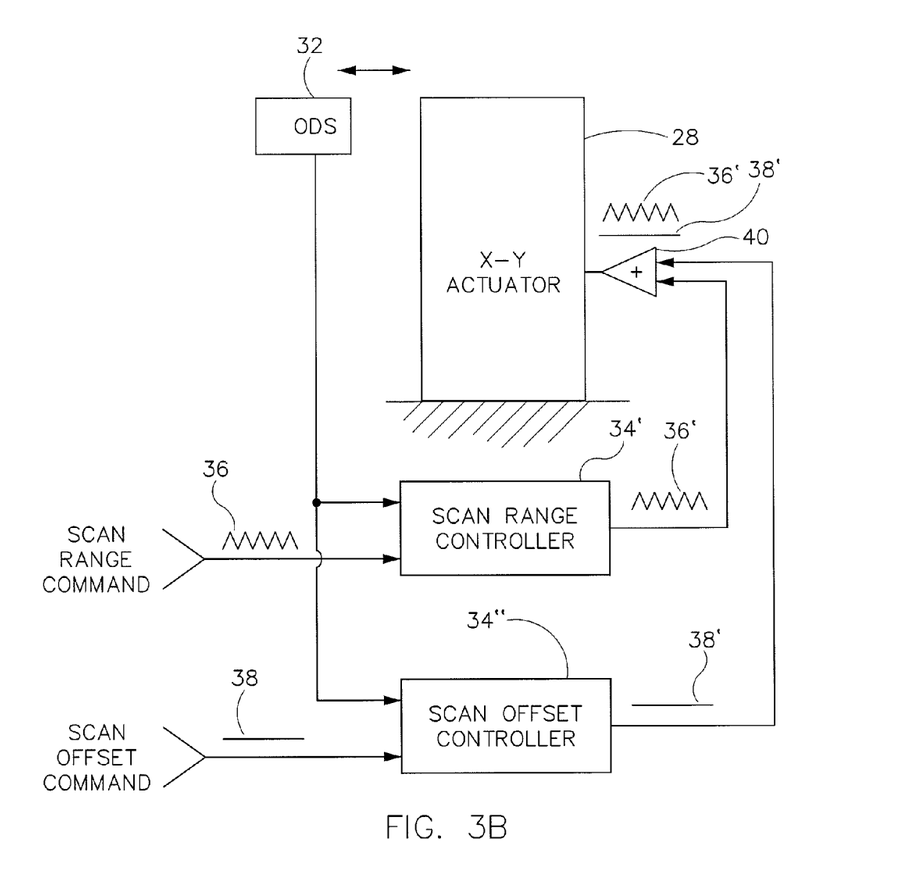
FIG. 3B schematically shows a second feedback control technique via which signals form the ODS of the SPM of FIG. 2 may be used to control SPM operation.

Possible techniques for controlling the X-Y actuator 28 of actuator arrangement 24 using closed loop feedback are schematically illustrated in FIGS. 3A and 3B. Referring first to FIG. 3A, ODS 32 monitors motion of the X-Y actuator 28 of the actuator arrangement 24 as the X-Y actuator 28 effects a scan operation. Position information signals obtained from the ODS 32 are forwarded to a feedback controller 34, where they are compared to commanded position signals. The feedback controller 30 may be either analog or digital in form and may be contained within controller 20 or take the form of a separate dedicated or semi-dedicated controller. As represented by the symbols 36 and 38, the command signal to which the signals from the ODS 32 are compared has two components, namely an AC scan range component 36 and a DC scan offset component 38. The scan range is the commanded scan area, which is typically smaller than the SPM's field of view. The scan offset is the offset between the center of the commanded scan area and the center of the SPM's field of view. The feedback controller 34 generates a correction signal in the form of a high voltage output signal having corrected components 36' and 38' as a result of this comparison and transmits that signal to the X-Y actuator 28.

A disadvantage of the feedback technique of FIG. 3A is that, because a single controller controls both scan range and scan offset, the ODS feedback is always applied under the same gain to both the scan and offset signal components, hence necessarily adding noise to both signal components 36' and 38'. This noise is greatly reduced when compared to prior ODS equipped SPMs, but is noise nonetheless.

Noise can be reduced in an ODS equipped SPM by independently adjusting the scan range and scan offset signals using separate scan range and scan offset controllers 34' and 34"as seen in FIG. 3B. Specifically, the scan range and scan offset controllers 34' and 34" receive scan range and scan offset signals 36 and 38 from the controller 20. The signals 36 and 38 are compared to the position signal from ODS 32 in the respective controllers 34' and 34" to form corrected signals 36' and 38'. The corrected signals 36' and 38' are then output to an adder 40, where they are combined to produce a two component signal as in FIG. 3A. The combined signal is then transmitted to the X-Y actuator 28. In this arrangement, as gain for the scan range signal 36 is reduced for small scans, the gain for the ODS corrected signal 36' is reduced proportionally and the noise in the final, combined signal from the adder 40 is also reduced. This technique is, per se, known in AFM OPS equipped applications.

Figure 4:
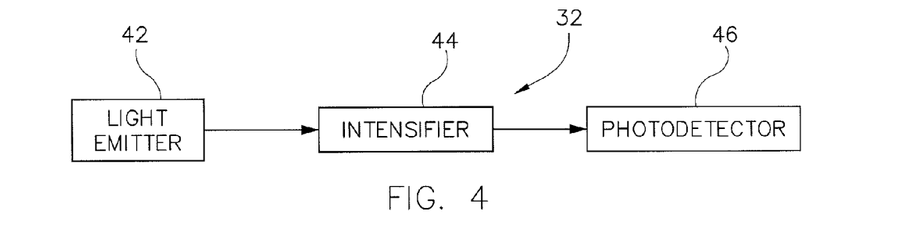
FIG. 4 is a block diagram of the ODS of the SPM of FIG. 2.
Figure 5:
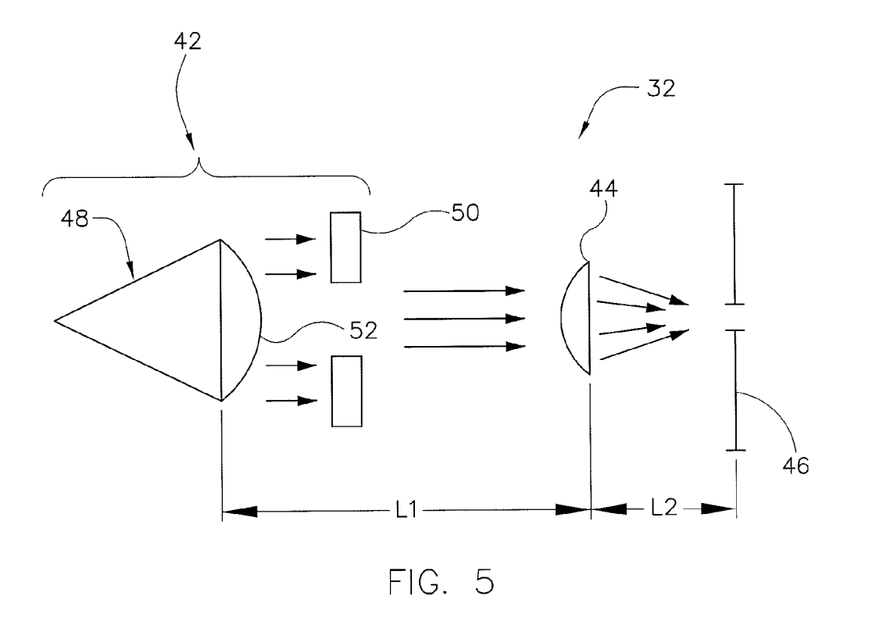
FIG. 5 schematically represents the ODS of FIG. 4.

The ODS 32 of FIG. 2 is illustrated in block form in FIG. 4 and schematically in FIG. 5. The ODS 32 includes at least a light emitter 42, an intensifier 44, and a photodetector 46 that act together to monitor movement of an associated actuator.

In a typical application, one of these devices will be situated so as to move with the associated actuator, either by direct mounting or through an intervening linkage or other device(s) connected to the actuator, and the other two devices remain stationary. In the preferred embodiment having a passive (non-powered) intensifier, the intensifier 44 moves with the AFM and the light emitter 42 and photodetector 46 remain stationary.

Referring now to FIG. 5, the light emitter 42 may comprise any device capable of transmitting light detectable by a photodetector to the intensifier 44. It may also generate that light or a portion of it. In the illustrated embodiment, it includes at least a light source 48 and may additionally include an aperture 50.

The light source 48 may, for instance, be a light emitting diode (LED), a laser, an incandescent light source, a fluorescent light source, or a fiber, fiber bundle, or mirror redirecting light from another source. An LED with a small emitting area is preferred. The light source 48 preferably includes a shaping device 52 such as a collimating lens, a focusing lens, a mirror, or diffractive optics positioned downstream of its emitter so as to assure that at least a majority of the emitted light would impinge on the intensifier 44 in the absence of the aperture 50. A suitable LED with an integral collimating lens is commercially available, for instance, from Photonic Detectors, Inc. under the model name PDI-E805.

The aperture 50 is not essential but is preferably included in order to reduce shot noise by reducing the total light that impinges on the photodetector 46. "Shot noise" is a result of the discrete nature of photons and is generated by random fluctuations of the intensity of light impinging on the photodetector. Since shot noise is a function of the aggregate amount of light impinging on the photodetector, employing an aperture to reduce the light that impinges on the photodetector reduces shot noise. The aperture preferably is configured to limit the light passing therethrough to that which contributes to the displacement signal. If present, the aperture 50 preferably has a shape that is dependent upon the properties of the photodetector 46. For instance, if the photodetector 46 comprises a split diode or a quad diode, the aperture 50 limits light to that which will move from one side of the detector face to another during SPM operation. A slit aperture is preferably used for a split diode photodetector and a cruciform aperture is preferably used for a quad diode photodetector. (A cruciform aperture is a cross shaped hole). Additional conditioning or shaping elements may, if desired, be imposed between the intensifier 44 and the photodetector 46 and/or between the light emitter 42 and the intensifier 44.

The intensifier 44 intensifies the light incident on the detector face of the photodetector 46, increasing the sensitivity of the ODS 32 and improving the ability of the SPM 10 to translate the actuator 28 in the desired manner. Incorporating an intensifier 44 into the ODS 32 also permits the use of a lower-power light source for a given sensitivity level, reducing the power dissipation in the system thereby reducing the adverse effects of thermal drift. It also permits the use of a wider slit aperture than could be used in a system without an intensifier 44, increasing the percentage of light passing through the aperture and increasing the gain.

The intensifier 44 preferably comprises a demagnifier that is positioned between the light emitter 42 and the photodetector 46 and that increases the intensity of the light incident on the detector face by "demagnifying" the light. "Demagnification" reduces the illumination area on the detector face for a given emitter transmission area. This reduction increases the intensity of the light on the detector by a factor equal to the square of the demagnification ratio. This in turn increases the detected displacement signal by a factor equal to the demagnification ratio. This is true because only the magnification in the direction across the split in the diode contributes to the increase in signal. The demagnification also decreases the distance that the image moves on the detector face for a given lens movement, but the loss of sensitivity is relatively small because the decrease in movement is equal to (1+1/D), where D is the demagnification ratio and is always greater than 1. The net sensitivity increase is equal to D/(1+1/D). The demagnification ratio of the ODS 32 is dependent on the properties of the demagnifier and on the relative distances between the demagnifier and the light emitter 42, on the one hand, and the demagnifier and the photodetector 46, on the other. The demagnifier may include one or a system of mirrors, one or a system of diffractive optics, and/or one or a system of lenses. It comprises a single lens in the illustrated embodiment. The lens is preferably arranged so as to image the light source onto the face of the photodiode. This results in a uniform illumination of the split area of the photodiode with sharp edges, which in turn results in good linearity and minimal shot noise. For a typical lens, demagnification occurs when the lens is closer to the photodetector than the light source, such that L1>L2 and the demagnification ratio is a function of L1/L2. The preferred demagnification ratio will vary from application, with designer preference, and with lens design. Slit width aperture limitations and limitations on the proximity of the lens to the photodetector limit the high end of demagnification ratio as a practical matter. Ratios of 1-10 are envisioned, with a ratio of about 3 being preferred in the present embodiment in which the lens is a aspherical molded lens optimized for that magnification or demagnification ratio.

Figure 6:
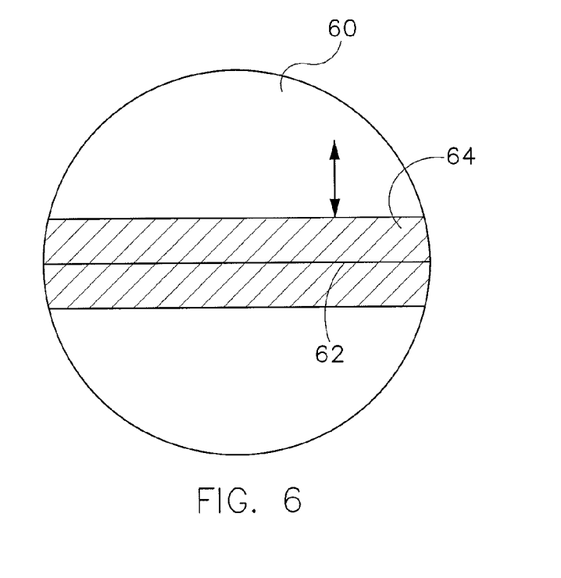
FIG. 6 schematically represents an illuminated region of a detector face of a split diode usable as a photodetector of the ODS of FIGS. 4 and 5.

The photodetector 46 may comprise any device that is capable of receiving intensified light from the lens and of outputting electrical signals indicative of the position of the lens. Split photodiodes, quadrant photodiodes, or juxtaposed discrete photodiodes may all be used for this purpose. Alternatives include CMOS or CCD one or two dimensional arrays, juxtaposed or integrated photoresitive detectors, juxtaposed or integrated phototransistors, vacuum photodiodes, avalanche photodiodes, or photomultiplier tubes. The photodetector might also be comprised of an arrangement of two or more photosensitive devices with a mirror, optical fibers or lenses that directs part of the light to one device while letting the rest travel to the second device. A split diode is preferred for one dimensional measurements and a quad diode is preferred for two dimensional measurements. Two-dimensional measurements could alternatively also be taken using two juxtaposed split diodes. Both split diodes and quad diodes detect movement of an illuminated area about a centerline of the detection face of the detector. That motion can be seen in FIG. 6 for a split diode, in which a generally rectangular illuminated area 64, as shaped by the slit aperture 50 and demagnified by the demagnifier 44, is wide enough to cover a centerline 52 of the detection face 60 at all positions of the demagnifier but narrow enough to avoid overspilling that face. Movement of the demagnifier 44 results in movement of the illuminated area 64 up or down in FIG. 6. That motion results in generation of a corresponding position or displacement signal (given as a result of the amount of light impinging on the sections defined by centerline 62), which is then transmitted to the appropriate controller as discussed above. A quad diode photodetector differs from a split diode photodetector in that it has both vertical and horizontal detection centerlines, hence separating the detection face into quadrants and being capable of providing position signals in two orthogonal directions. As mentioned above, a cruciform aperture should be used with a quad diode and would produce a "+" shaped illuminated area on the detection face of the photodetector.

It has been found that the ODS 32 as described, including a slit or cruciform aperture, increases sensitivity by as much as a factor of 10 when compared to prior devices lacking an aperture and an intensifier. Noise levels per micrometer of actuator scan range of less than 0.00045 nm RMS per root Hz bandwidth and power dissipation levels of less than 150 mW are possible. In fact, the assignee has successfully tested an AFM containing an ODS as described herein. The ODS noise level is 0.6 nm RMS with a 1 kHz bandwidth and a 100 micrometer actuator range of movement. This represents a noise level per micron of range of actuator movement of 0.0002 nm RMS per root Hz bandwidth. The ODS also exhibits 1.5% total integrated nonlinearity and a power dissipation of about 50 mW. The Park system described above, on the other hand has a noise level of about 6.0 nm RMS with a 1 kHz bandwidth and a 100 micrometer actuator range of movement. This represents a noise level per micrometer of range of actuator movement of 0.002 nm RMS per root Hz bandwidth. Veeco's Hybrid head scanner, described above, has a noise level per micron of range of actuator movement of 0.0006 nm RMS per root Hz bandwidth despite employing an expensive and highly specialized light source.

Figure 7:
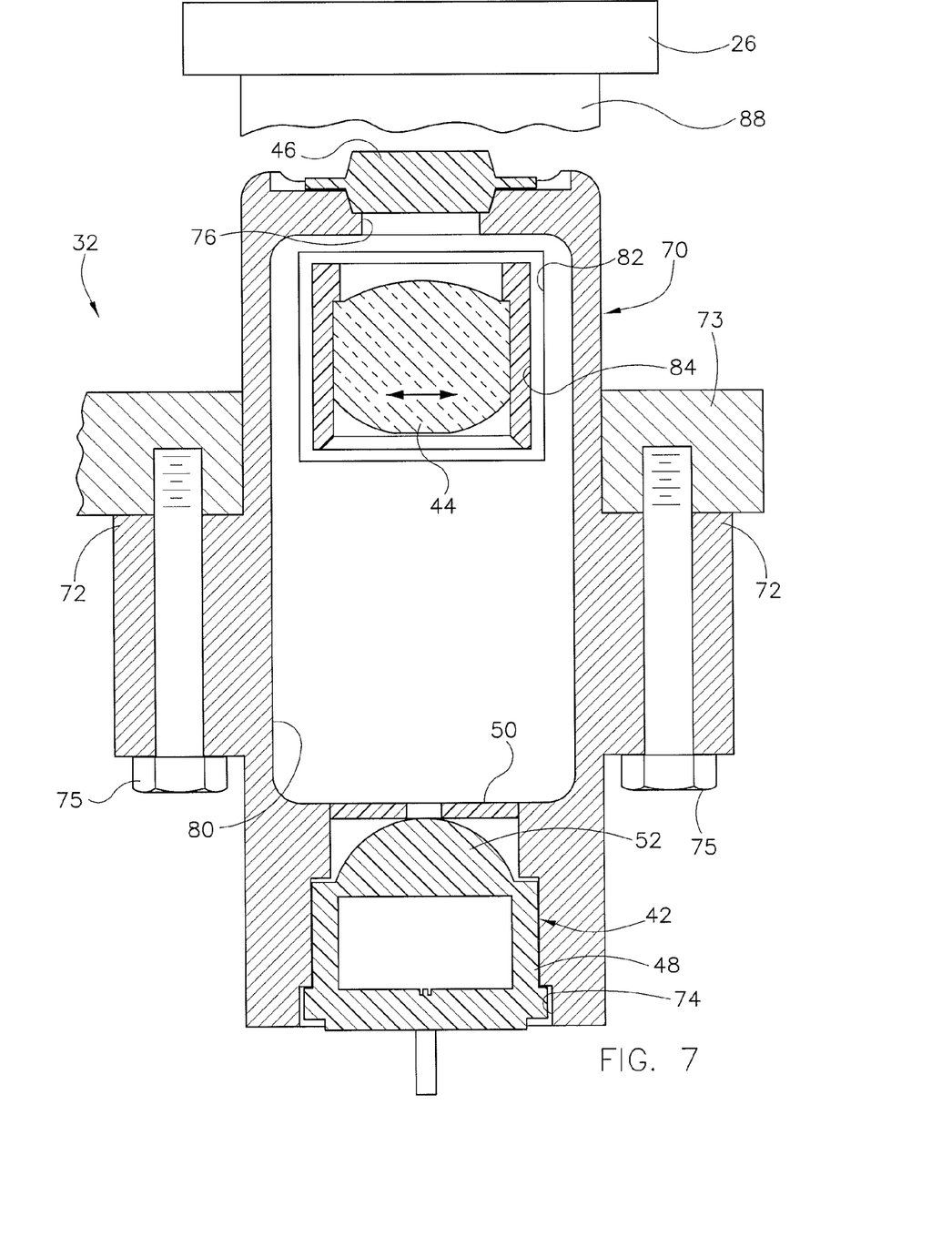
FIGS. 7 and 8 are side sectional elevation views of a more practical embodiment of the ODS of FIGS. 4 and 5, taken along mutually orthogonal axes.
Figure 8:
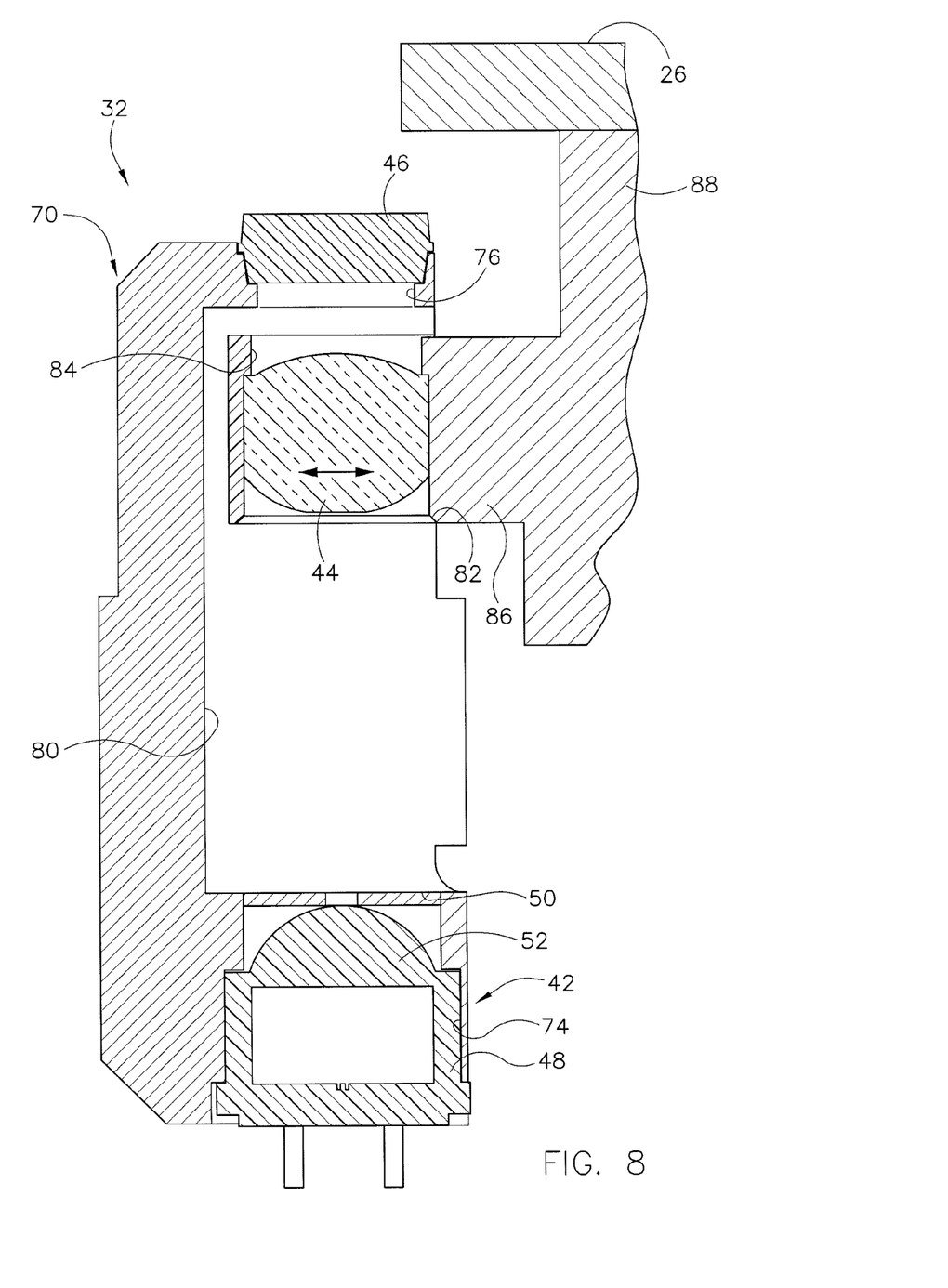
Figure 9:
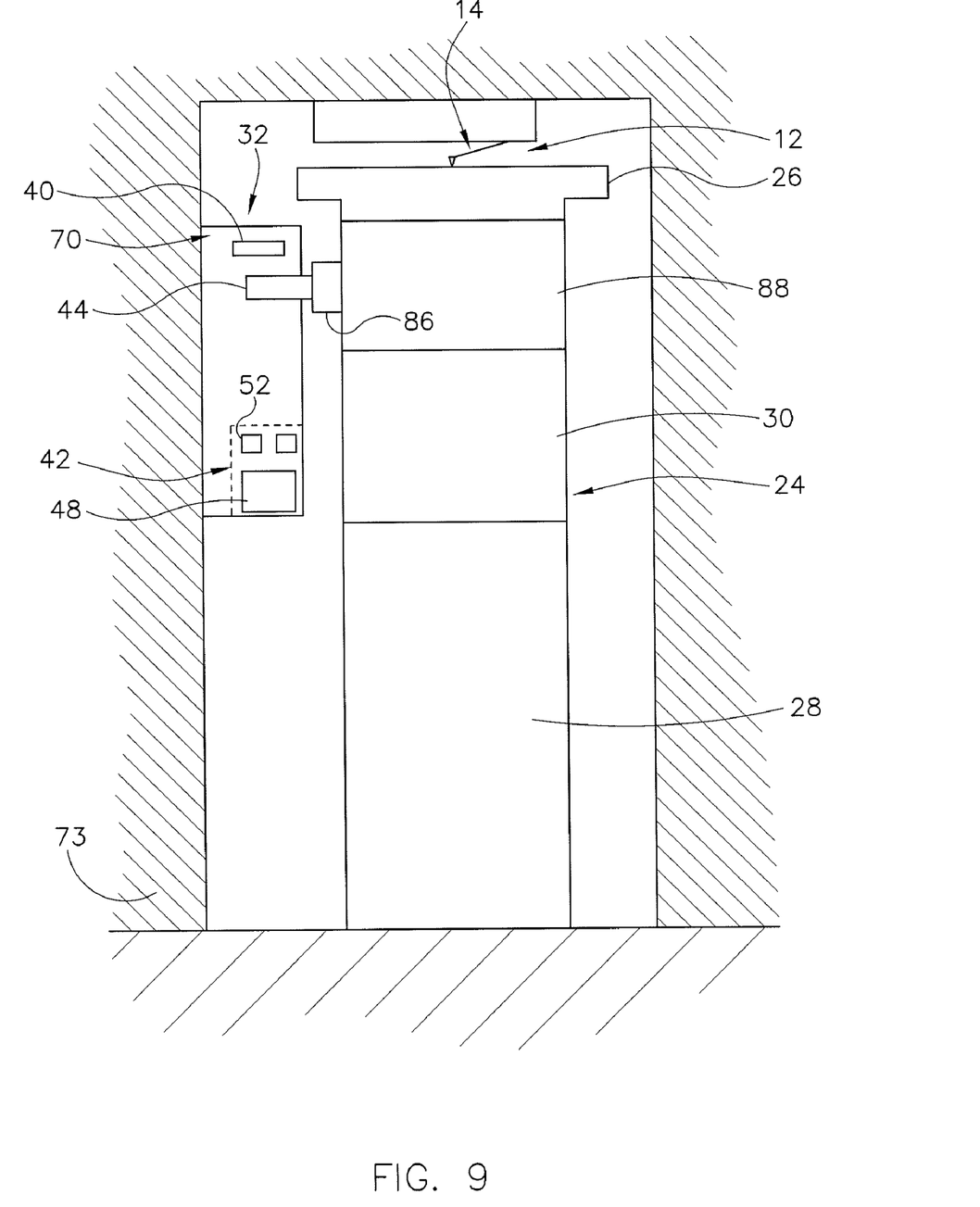
FIG. 9 somewhat schematically illustrates the SPM of FIG. 2 with the ODS of FIGS. 4, 5, 7, and 8 monitoring movement of an X-Y actuator of the SPM.

A more specific embodiment of the ODS 32 and packaging and mounting structures for mounting the ODS 32 on the specific actuator arrangement shown in FIG. 9 are shown in FIGS. 7 and 8, it being understood that a wide variety of other devices could be used to mount the same or similar ODSs on the actuator arrangement 24 of FIGS. 2 and 9 or other actuator arrangements entirely. The ODS 32 is mounted in a housing 70 having mounts 72 for rigid connection to a stationary structure of the SPM, such as a mounting plate 73 of an AFM scan head support using bolts 75 or the like. The housing 70 has lower and upper openings 74 and 76 in which the emitter 42 and the photodetector 46, respectively, are fixed. As described above, the emitter 42 preferably comprises an LED light source 46 with an integrated collimating or focusing lens 52 as described above, along with a cruciform aperture 50 fixed in the opening 74 near its upper end. The photodetector 46, preferably a quad diode photodetector of the type described above, is fixedly mounted in the upper end of the housing 70 over the opening 76. A central opening 78 running the length of the housing 70 provides an optical path from the emitter 42 to the photodetector 40.

A side opening 82 is formed in the housing 70 between the lower and upper ends 74 and 76 and opens into a chamber 84 that receives the intensifier 44, preferably a demagnifying lens. A mount 86 extends into the chamber 84 through the opening 82 and is coupled to the actuator arrangement 24 at its outer end and to the lens 44 at its inner end. The mount 86 preferably is positioned as close as practical to the driven end of the actuator arrangement 24 so as to experience the maximum magnitude of out-of-direction movement of the X-Y actuator 28. In the present case in which the actuator arrangement 24 drives the sample mounted on sample support 26 to move as seen in FIG. 9, the mount 86 is mounted on or formed by a protrusion of a spacer 88 sandwiched between the Z actuator 30 of the actuator arrangement 24 and the sample support 26. The Z actuator 30 is, in turn, is mounted on top of the X-Y actuator 28 such that motion of the X-Y actuator 28 is translated to the lens 44 through the Z actuator 30 and the spacer 88. Still referring to FIG. 9, the spacer 88 should be sufficiently high to provide clearance between the upper end of the photodetector 46 and the bottom of the sample support 26.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. Some of the changes are discussed above. In addition, while the inventive optical based displacement sensing technique has been described in conjunction with monitoring the positions of actuators for scanning probe microscopes, an OSD constructed in accordance with the present invention could also be used to monitor other movements such as the movements of precision actuators used in nano-patterning. In fact, it could be used for the detection of any nano-scale displacement. The scope of still other changes to the described embodiments that fall within the present invention but that are not specifically discussed above will become apparent from the appended claims and other attachments

The invention claimed is:

1. A method of monitoring movement of an SPM actuator comprising:
    (A) directing light from a light emitter to an intensifier;
    (B) impinging light from the intensifier on a photodetector that is intensified relative to the light from the emitter; and
    (C) detecting movement of the SPM actuator based on a detected movement of the intensified light on the photodetector.

2. The method of claim 1, wherein the intensifier is a demagnifier and the light is intensified by demagnification.

3. The method of claim 2, wherein the demagnifier is a demagnifying lens.

4. The method of claim 3, wherein the lens is positioned between the emitter and the photodetector and is positioned closer to the photodetector than to the emitter.

5. The method of claim 1, one of the light emitter, the intensifier, and the photodetector moves with the SPM actuator.

6. The method of claim 5, wherein the intensifier moves with the actuator.

7. The method of claim 5, wherein the others of the light emitter, the intensifier, and the photodetector are stationary relative to the actuator.

8. The method of claim 1, wherein the emitter comprises a light source and device that has an aperture that limits the light passing to the photodetector to at least generally that which is capable of contributing to a displacement measurement.

9. The method of claim 8, wherein the aperture is one of a slit aperture and a cruciform aperture.

10. The method of claim 8, wherein the light source comprises a LED.

11. The method of claim 8, further comprising a shaping device that, but for the presence of the aperture, would cause at least essentially all of the light from the light source to impinge on the intensifier.

12. The method of claim 11, wherein the shaping device comprises at least one of a collimating lens and a focusing lens.

13. The method of claim 1, wherein the photodetector is a split diode.

14. The method of claim 1, wherein the photodetector is a quad diode.

15. A method of detecting movement of a SPM actuator, the method comprising:
    (A) generating light using a light source;

(B) transmitting a portion of the light through an aperture; then (C) directing the light through a demagnifying lens that moves with the SPM actuator to demagnify and intensify of the light passing therethrough; then (D) impinging the demagnified and intensified light from the demagnifying lens on a photodetector.

16. A SPM comprising:

(A) a probe;

(B) an actuator that generates movement of at least one of the probe and a sample; and (C) an optical displacement sensor that monitors movement of the actuator, the optical displacement sensor including,
  a. a light emitter;
  b. an intensifier that receives light from the emitter, and
  c. a photodetector that receives intensified light from the intensifier.

17. The SPM of claim 16, wherein the intensifier is a demagnifier that intensifies light by demagnification.

18. The SPM of claim 17, wherein the demagnifier is a demagnifying lens.

19. The SPM of claim 18, wherein the lens is positioned between the emitter and the photodetector and is positioned closer to the photodetector than to the emitter.

20. The SPM of claim 16, wherein one of the emitter, the intensifier, and the photodetector moves with the actuator.

21. The SPM of claim 20, wherein the intensifier moves with the actuator.

22. The SPM of claim 20, wherein the others of the emitter, the intensifier, and the photodetector are stationary relative to the actuator.

23. The SPM of claim 16, wherein the emitter comprises a light source and a device that has an aperture that limits the light passing to the photodetecector to an area that is smaller than that of a detection surface of the photodetector.

24. The SPM of claim 23, wherein the aperture is at least one of a slit aperture and a cruciform aperture.

25. The SPM of claim 23, wherein the light source comprises a LED.

26. The SPM of claim 23, further comprising a shaping device that, but for the presence of the aperture, would cause at least a majority of the light from the light source to impinge on the intensifier.

27. The SPM of claim 26, wherein the shaping device comprises at least one of a collimating lens and a focusing lens.

28. The SPM of claim 16, wherein the photodetector comprises one of a split diode and a quad diode.

* * * * *